United States Patent [19]

Danko

[11] 4,093,773
[45] June 6, 1978

[54] FINISHING WELT, AND METHOD AND APPARATUS FOR FORMING FINISHING WELTS

[75] Inventor: Edward M. Danko, Detroit, Mich.

[73] Assignee: Color Custom Compounding, Inc., Warren, Mich.

[21] Appl. No.: 724,815

[22] Filed: Sep. 20, 1976

[51] Int. Cl.² .............................................. D02G 3/00
[52] U.S. Cl. ................................... 428/365; 428/376; 428/397
[58] Field of Search ............... 428/397, 400, 399, 373, 428/374, 365, 364, 375, 376, 377

[56] References Cited

U.S. PATENT DOCUMENTS

| | | | |
|---|---|---|---|
| 2,717,636 | 9/1955 | Hormuth et al. | 428/365 |
| 3,177,900 | 4/1965 | Sharp | 428/365 X |
| 3,616,147 | 10/1971 | Ambrose | 428/397 X |
| 3,652,374 | 3/1972 | Condon | 428/296 |

*Primary Examiner*—Lorraine T. Kendell
*Attorney, Agent, or Firm*—Cullen, Settle, Sloman & Cantor

[57] ABSTRACT

A finishing welt, comprised of a reinforcing polyethylene rod surrounded by a fabric scrim and an outer encasing layer of polyvinyl chloride, is formed in an extrusion-embossment method and apparatus.

The method includes feeding a composite preform, consisting of the polyethylene rod and the scrim, first through an essentially key-hole shaped passageway in a core pin of an extruder crosshead and then into a chamber within the crosshead where plastic material under pressure flows onto the preform. Immediately thereafter, the preform is conveyed through an essentially key-hole shaped orifice, where the welt is formed by extrusion. Next, the opposed sides of the welt are sequentially embossed as the welt is conveyed over external peripheral embossing surfaces of two spaced rollers.

The resultant welt is essentially key-hole shaped in cross-section, with the scrim surrounding the rod within the enlarged head portion of the welt and extending into the smaller depending flange portion. As a result of the extrusion step, the outer encasing layer of polyvinyl chloride is bonded through the scrim in the welt flange; and as a result of the sequential embossment, the outer surface of the welt is free of any significant longitudinal rib.

3 Claims, 8 Drawing Figures

U.S. Patent  June 6, 1978  Sheet 1 of 2  4,093,773
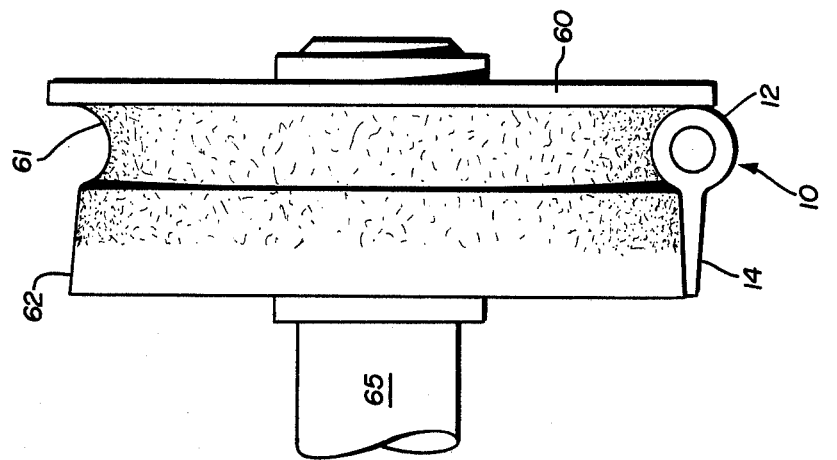
FIG. 8
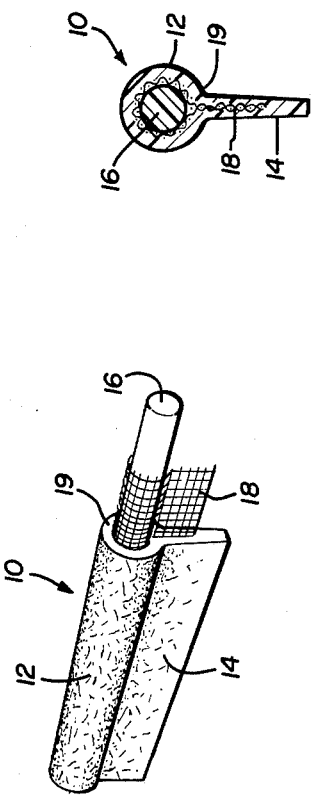
FIG. 2
FIG. 1
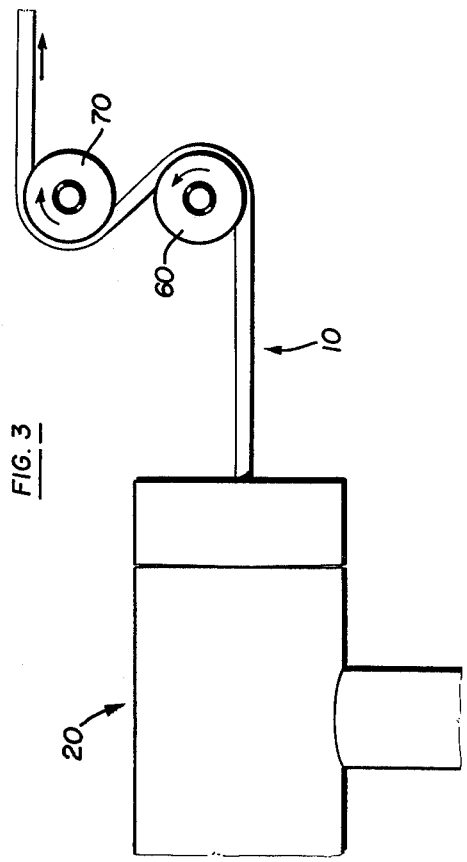
FIG. 3

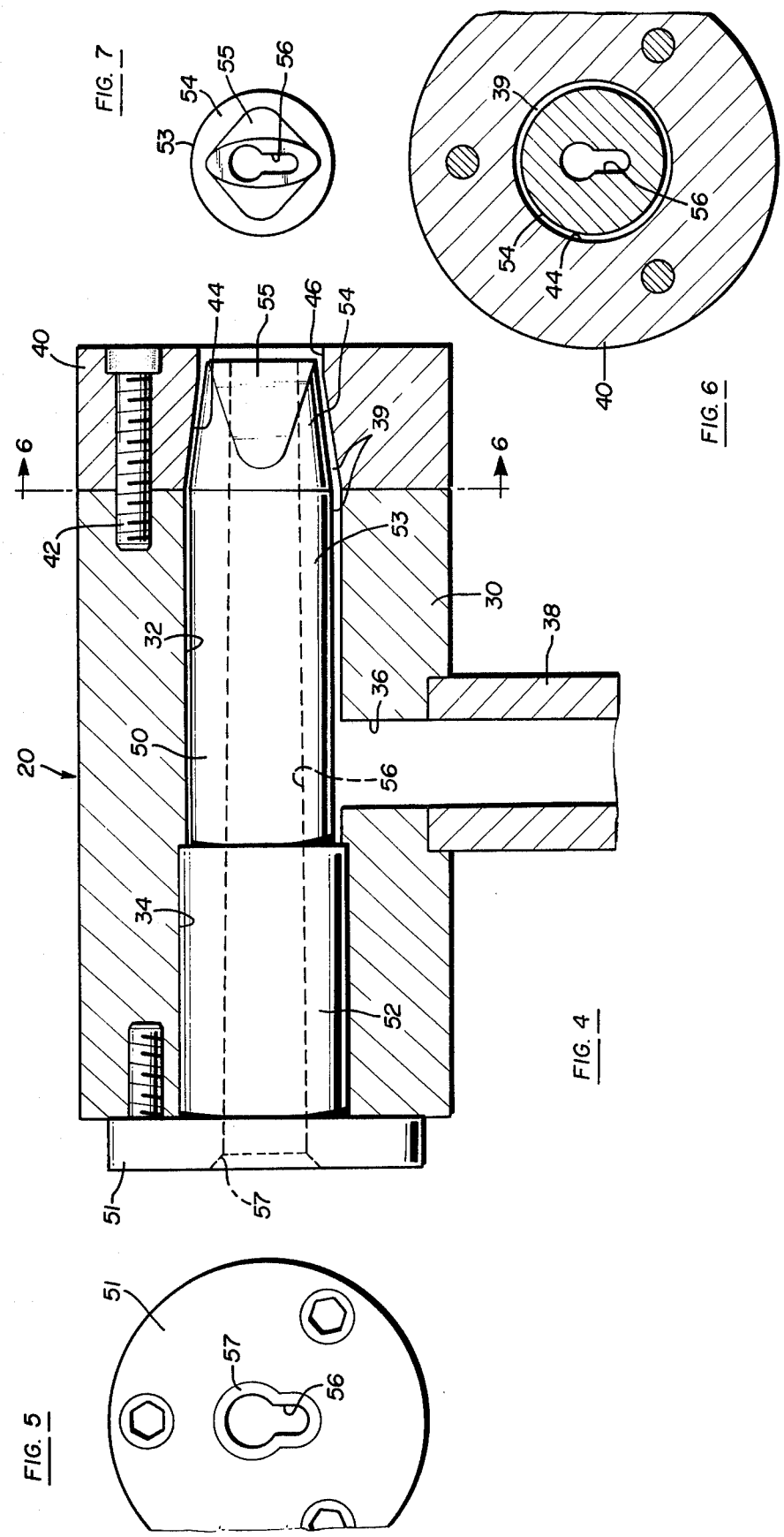

FINISHING WELT, AND METHOD AND APPARATUS FOR FORMING FINISHING WELTS

BACKGROUND OF THE INVENTION

1. Field of the Invention

Very generally, the present invention relates to a finishing welt for use in upholstery, such as in automobiles, and to the method and apparatus for forming the finishing welt. More specifically, the welt is formed by extrusion and then embossed in two separate, sequential embossing operations to form a grained appearance on its exterior surface.

2. The Prior Art

Finishing welts made of plastic materials are now quite commonly used in automotive interiors to join the edges of two adjacent upholstery panels. Typically, such welts include a bead portion to provide a decorative appearance at the line of upholstery juncture and a flange to which the upholstery panels are sewn or otherwise attached. With the welts serving these functions, it is desirable that the bead be embossed with a grain appearance and that the flange be reinforced. Additionally, it is desirable to provide the welt bead with an inner reinforcement for extended durability.

Prior methods of making welts have experienced various undesirable shortcommings or disadvantages, which have been solved by the present invention.

For example, one prior method of embossing a welt included passing the welt bead simultaneously through two adjacent graining rollers. This method, while achieving the grained appearance, is undesirable because it forms a longitudinal non-grained rib on the welt bead at the line of contact between the two rollers.

A second prior art method includes passing the welt beneath one graining roller, which flattens and embosses approximately one half of the welt bead, but leaves the other half of the bead around the flange ungrained. Obviously, this method is undesirable from a decorative standpoint.

A third prior art method of forming a welt has been highly successful at providing a grained appearance over the entire welt bead, but includes several other manipulative steps which may be eliminated by the present invention. This third method is disclosed in U.S. Pat. No. 2,958,909 and includes the steps of (a) extruding a substantially flat plastic preform having a raised segment destined to become the welt bead, (b) embossing the raised preform portion by a roller to provide the grained appearance, (c) bending the preform into the configuration of the welt and then (d) fusing the two portions of the welt flange together.

A fourth method of making a finishing welt involves simply adhering the component parts by an adhesive. In this method, the outer layer of plastic material is formed in a sheet and then embossed on one side. Subsequently, the sheet is cut into segments, which are adhesively secured to a fabric scrim. Thereafter, the adhered scrim and plastic segments are wrapped around a plastic rod and adhered by adhesive in the desired shape. This method is undesirable from at least two aspects: First, the manipulative adhering steps are both time-consuming and costly. Second, the scrim formed by this method is somewhat easily disassembled into its component parts, by virtue of its being held together only by an adhesive.

Thus, the prior art methods of forming welts are incapable of forming an integral welt including a reinforcing rod and scrim, wherein the entire welt bead is embossed and the plastic material is integrally bonded to and through the scrim in the welt flange.

The present invention overcomes these problems by extruding polyvinyl chloride material over a composite preform in a cross head extruder and then sequentially embossing the two opposed sides of the welt bead.

Of course, other prior art has previously suggested the formation of reinforced articles by extruding plastic material over one or more preforms, examples of such prior art being U.S. Pat. Nos. 3,697,209, 3,487,149, 3,899,384, 3,544,669, 2,422,281, and 3,375,550. However, none of these Patents suggest the overall method, apparatus, or product of this invention.

SUMMARY OF THE INVENTION

This disclosure relates to various inventive aspects which can be fully appreciated by the varying scope of the appended Claims. For example, one aspect of this invention relates to an improved finishing welt formed as a product of extrusion; other aspects relate to a method of making a welt, a method of sequentially embossing the sides of an arcuate portion of an extruded product and an apparatus for forming a welt.

More particularly, one aspect of this invention relates to welt, per se, which is comprised of a generally cylindrical head portion integral with a depending tail portion. A polyethylene rod is centrally located within the welt head and a fabric scrim surrounds the rod in the welt head and extends into the welt tail for reinforcement. An outer encasing layer of plastic material covers the scrim and the polyethylene rod, the plastic material being bonded to and extending through the scrim in the region of the welt tail, providing strength and resistance to separation of the welt components. The outer surface of the plastic welt held includes an embossed grain appearance free of any substantial protruding rib, by virtue of having been formed in two separate stages by two spaced embossing surfaces.

In one of the method aspects of this invention, a composite preform, comprised of the reinforcing rod and fabric scrim, is fed through a keyhole shaped guide passage in a core pin of a cross head extruder. As the preform exits from the core pin within the extruder cross head, plastic material flows onto the preform and then the plastic-coated preform is extruded through a generally key-hole shaped orifice which is in general alignment with the similarly shaped passageway in the core pin.

Optionally, the outer surface of the welt may be embossed to provide a grained surface by conveying the extruded welt under tension over a roughened surface of a first roller, and thereby embossing slightly more than half of the outer surface of the welt head as the welt is conveyed around a portion of the roller periphery. Thereafter, the welt is conveyed away from the first roller and into engagement with the roughened surface of a second roller to emboss the other half of the welt. The two areas of roller-welt contact overlap, so that continuous graining is obtained without an unsightly non-grained rib or space.

Another independent aspect of this invention relates to the continuous embossment of the outer surface of an essentially cylindrical portion of an elongated plastic article by, first, conveying the plastic article away from an extrusion orifice under tension into engagement with two spaced, rotatable rollers having essentially identical annular, roughened embossing grooves. In this method, the opposed, essentially semi-cylindrical side surfaces of the article are sequentially embossed as one of the opposed semi-cylindrical surfaces is conveyed into engagement with the roughened embossing groove on the first roller and then as the other of the opposed semi-cylindrical surfaces is conveyed into engagement with the roughened embossing groove on the second roller.

The apparatus aspect of this invention includes a housing having a plastic material supply passage communicating with an essentially cylindrical chamber which tapers at one end into an essentially key-hole shaped extrusion orifice. A core pin is concentrically positioned within the housing chamber, defining an essentially annular flow passageway for plastic material. The core pin includes a tapering nose portion which extends into the tapering region of the housing chamber and which terminates within the cross head adjacent the extrusion orifice. Additionally, an essentially key-hole shaped guideway extends throughout the length of the core pin in general alignment with the key-hole shaped orifice, for guiding a composite preform through the cross head. Optional means may be provided for sequentially embossing the opposed sides of the extruded welt, each means including first and second cylindrical rollers having a respective roughened arcuate groove around their periphery. The first of the rollers is arranged essentially in tangential alignment with the longitudinal axis of the core pin and the extruder orifice, whereas the second roller is spaced from that longitudinal axis and from the first roller so that the welt is sequentially conveyed into engagement with each of the rollers.

Accordingly, the present invention provides several advantages over the prior art, including: (1) a reinforced welt which is integrally molded and resistant to wear and separation; (2) a simplified method for forming a composite welt comprised of a composite preform including a reinforcing rod and scrim; and (3) a method and apparatus for embossing the outer surface of an extruded arcuate product, without the formation of either an elongated, protruding rib or a non-embossed space.

These and other advantages and meritorious features will be more fully appreciated from the following detailed description and the appended claims.

BRIEF DESCRIPTION OF THE DRAWINGS

FIG. 1 is a perspective view, illustrating the component parts of the welt of this invention.

FIG. 2 is a cross sectional view of the welt formed by this invention, illustrating that the plastic encasing material is bonded through the scrim in the tail or flange region of the welt.

FIG. 3 is a schematic illustration of the extruder and the embossing rollers.

FIG. 4 is a partial cross sectional view, illustrating the components of the extruder cross head.

FIG. 5 is an end view of the core pin, illustrating the flared entry end of the key-hole configured guide passageway which extends throughout the length of the core pin.

FIG. 6 is a cross sectional view taken along plane 6—6 of FIG. 4.

FIG. 7 is a front view of the core pin, illustrating the tapered nose region and the exit region of the key-hole configured guide passageway.

FIG. 8 is a frontal view of one of the embossing rollers, illustrating the peripheral embossing groove within which the head portion of the welt is conveyed during the sequential embossing operation.

DETAILED DESCRIPTION OF THE PREFERRED EMBODIMENT

Referring now more particularly to the drawings, FIGS. 1 and 2 collectively illustrate the extruded welt of this invention, shown by reference numeral 10. The welt is generally key-hole configured and includes an enlarged bead or head 12 and a reduced tail or flange section 14. As can be seen, the interior of the welt is formed from a composite preform comprised of a reinforcing rod 16 and a reinforcing scrim 18. The rod is generally centrally located in the head portion of the welt and may be formed, for example, of one-eighth inch polyethylene rod stock. Other suitable rod stock, which has a higher melting temperature than the outer enclosing layer of extruded plastic and which is flexible, may also be used. The scrim provides a dual function of reinforcement and enhancing the bond with the outer extruded layer of thermoplastic material. As shown by both FIGS. 1 and 2, the scrim surrounds the rod in the welt head and extends down into the welt tail for reinforcement. Preferably, the scrim will be formed of either cotton or polyester. Optionally, the scrim may include a coating of a low-melt material, such as polyvinyl acetate, which is melted during the extrusion process in order to enhance the bond between the encasing plastic layer 19 and the preform. Such a coated fabric scrim may be obtained from Aucterlonie, Inc.

As discussed in greater detail below, the outer encasing layer of plastic material 19 is extruded over the composite preform and may be comprised of any suitable thermoplastic material, such as polyvinyl chloride. FIG. 2 shows that the outer encasing layer of this plastic material extends through the scrim in the welt tail, by virtue of the extrusion process, thus providing an integral bond particularly in this region which is resistant to separation of the welt article into the individual components.

Turning now to FIG. 3, an extruder cross head 20 is schematically illustrated, from which the welt 10 is extruded and then conveyed into sequential engagement with embossing roller 60 and 70. From the rollers, the welt may optionally be conveyed to a water bath for tooling. As the welt is extruded from the cross head 20, it is generally in the configuration as shown in FIGS. 1 and 2, but without any embossment on the outer surface. The embossment is achieved by placing approximately one half of the outer surface of the welt in engagement with a roughened, embossed surface on roller 60, thereby embossing approximately one half of the welt. Thereafter, the other side or half of the welt is placed into engagement with a roughened, embossed surface of roller 70, thereby completing the embossment. By this method, each half of the welt may be embossed in separate stages to eliminate the formation of an elongated rib at the center, top portion of the welt head. Most preferably, the embossing step will be performed while the extruded product is still sufficiently deformable by virtue of the heat retained from the extrusion step.

In order to more specifically describe the extruder cross head 20, reference is now made more particularly to FIGS. 4–7, where the cross head is illustrated as being comprised primarily of an extruder housing 30, a die plate 40, and an elongated core pin 50.

The extruder housing 30 includes a first, essentially cylindrical bore 32 and a larger essentially cylindrical counter bore 34, within which the elongated core pin 50 is arranged. A lateral bore 36 extends radially outwardly from bore 32 into communication with a supply manifold 38, which delivers heated, flowable plastic material from an appropriate plasticizer, such as a continuous feed rotary screw plasticizer.

The die plate 40 is secured to the forward end of the extruder housing 30 by a plurality of radially arranged bolts 42 which are received within appropriately threaded bores, as shown in FIG. 6. A tapering bore 44 in the die plate aligns with bore 32 to provide a passageway for the flowable thermo-plastic material. At the other end of the tapering bore 44, the die includes a generally key-hole configured extrusion orifice 44, corresponding in size and shape to the extruded welt illustrated in FIGS. 1 and 2.

The core pin may be formed, for example, of tool steel and includes a rear mounting flange 51, an enlarged boss 52, an essentially elongated cylindrical portion 53, and a tapering nose portion 54 having flat lands 55. As shown in FIGS. 4 and 5, the mounting flange 51 is secured to the rear portion of the extruder housing 30 by a plurality of radially arranged bolts. The enlarged boss 52 closely seats within counterbore 34, serving to concentrically center the elongated portions 53 and 54 within the bore 32 and the tapering section 44 of the die plate, respectively. With the core pin thus positioned within the extruder cross head, an annular passageway 39 is formed, through which the plastic material from the supply manifold 38 flows toward the extrusion orifice 46. Of course, the passageway 39 is truly annular in the region of core pin section 53, but tapers within the die plate 40 as it tapers toward the key-hole configuration of the die orifice 46.

The core pin also includes an elongated, key-hole shaped guide way 56 throughout its length for guiding the composite preform, i.e., the reinforcing rod and fabric scrim, to the extrusion orifice 46. As shown in FIGS. 4 and 5, the mounting flange may include an optional, outwardly flaring passageway entrance 57 to facilitate the insertion of the composite preform into the longitudinal passageway 56. Additionally, the passageway 56 may taper in size from the outwardly flaring opening 57 to the opposite end of the core pin adjacent the extrusion orifice 46, as can be seen by comparing FIGS. 5, 6, and 7.

As will be appreciated, the method of forming the integral, composite welt prior to the embossing step is accomplished by feeding the fabric scrim wrapped around the polyethylene reinforcing rod through the elongated passageway 56 in the core pin 50. As the preform is fed through the core pin, the rod 16 is within the enlarged head portion of the opening and the fabric scrim is wrapped over the rod and drapes down into the reduced flange portion of the opening. Simultaneously, heated flowable thermoplastic material is fed into passageway 39 by the supply manifold 38. The heated plastic material flows completely around the composite preform as it exits the forward end of the core pin adjacent the extrusion orifice. Then the welt product is formed by extrusion as the plastic material and the encased preform exit through the key-hole shaped extrusion orifice 46.

After leaving the extruder cross head, the welt 10 is conveyed to a pair of spaced embossing rollers 60 and 70, as shown in FIG. 3, to sequentially emboss the sides of the welt, particularly the welt head 12.

Roller 60, which is identical to roller 70, is illustrated in detail in FIG. 8 and includes an annular, arcuate, groove 61 and a relatively flat, angular portion 62. As shown in FIG. 8, the head portion 12 of the welt is received in the arcuate groove 61, with the welt tail 14 lying flat against portion 62. Due to the nature of the welt product, the bead or head portion 12 is embossed with a grained surface and therefore the arcuate groove 61 includes a roughened, grained surface formed, for example, by etching. Optionally, the roughened surface may extend down onto a portion or onto all of flat portion 62 to provide a grained appearance to the welt tail 14. The roller 60 may be mounted in any desired manner for free rotation, such as upon a freely rotatable shaft 65 shown in FIG. 8.

In the embossing phase of the method, the welt is conveyed first into engagement with the roller 60, whereby the top half of the welt, as viewed in FIGS. 3 and 8, is placed in contact with the embossing peripheral surface of roller 60. As the welt engages the embossing surface 61, the roller rotates about its axis so that there is no relative movement between the welt and the embossing surface in order to achieve a well-defined embossment. During this same phase of embossment, only approximately one half of the arcuate surface of the welt head is embossed, as shown in FIG. 8. Preferably, the embossed groove 61 is slightly larger than one-half of the welt head 12, so that slightly more than half of the welt head is embossed as it passes in engagement with roller 60.

As shown in FIG. 3, the welt is conveyed around less than half of the circumference of the roller 60 and then conveyed in engagement with freely rotatable roller 70 where the other half of the welt is embossed. Again, the peripheral, annular groove on roller 70 is preferably larger than about half the peripheral surface on the welt head 12, so that the entire periphery of the welt head is embossed, in a slightly overlapping manner to assure that a longitudinal rib is not formed on the welt.

It will be appreciated that the foregoing description is exemplary in nature, rather than limiting, since the invention is limited only by the following Claims. For example, the method has been described, for the most part, as including both the extrusion and embossing steps; those skilled in the art will readily appreciate that these two methods may be performed either in combination or separately.

Having therefore completely and sufficiently described my invention, I now claim:

1. An upholstery welt of indeterminate length, having a generally cylindrical head portion integral with a generally radially projecting sewing tail portion;

the welt consisting essentially of (a) a, cylindrical, flexible plastic rod coextensive with the welt and coaxially located within the head of the welt, (b) a fabric scrim wrapped about the rod in the head portion of the welt and having an end portion extending radially into the welt tail portion for reinforcement, and (c) an outer layer of thermoplastic material having an outer, generally key-hole shaped surface, the plastic material encasing the scrim in the region of the welt tail, encasing the rod and scrim in the head of the welt, and self-bonding to itself through the interstices of the scrim in the welt tail to form a, generally key-hole shaped structure reinforced at its head portion by said rod and at its tail portion by said scrim internally located therein.

2. The welt as defined in claim 1, wherein said outer encasing layer of plastic material is comprised of polyvinyl chloride and said rod is comprised of polyethylene.

3. The welt as defined in claim 1, wherein said outer layer is extruded over said scrim and said rod and said scrim is at least partially coated with polyvinyl acetate which is melted during extrusion.

* * * * *